Figure 6:
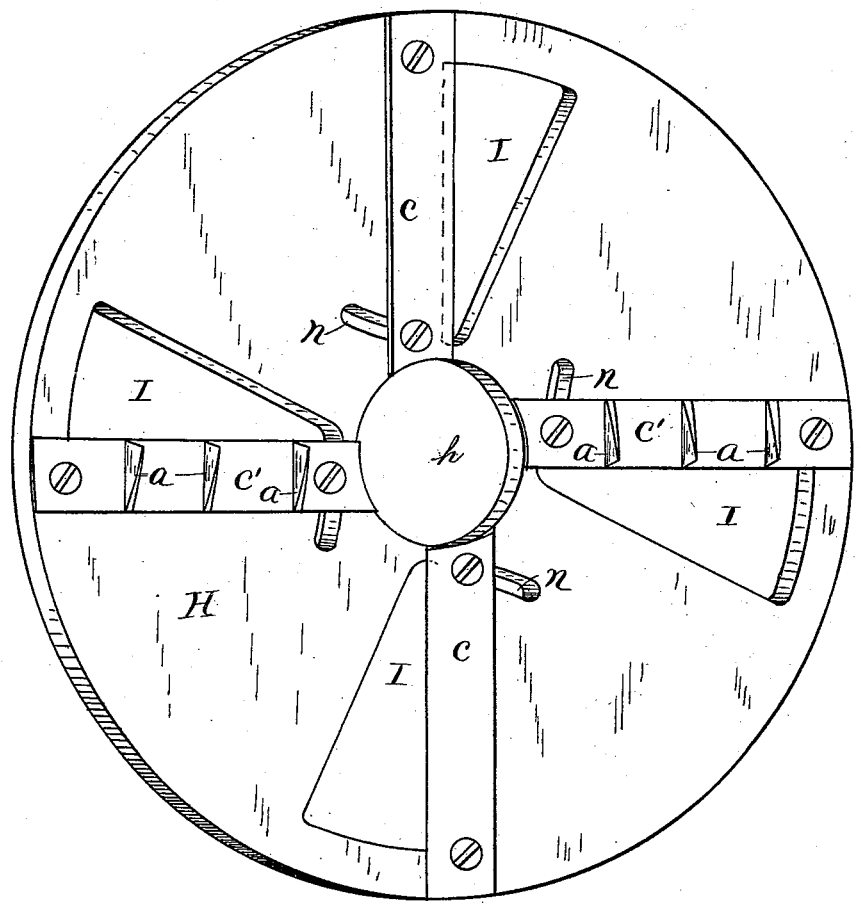

(No Model.) 3 Sheets—Sheet 1.
C. MARTINDALE.
KRAUT CUTTER.
No. 477,377. Patented June 21, 1892.
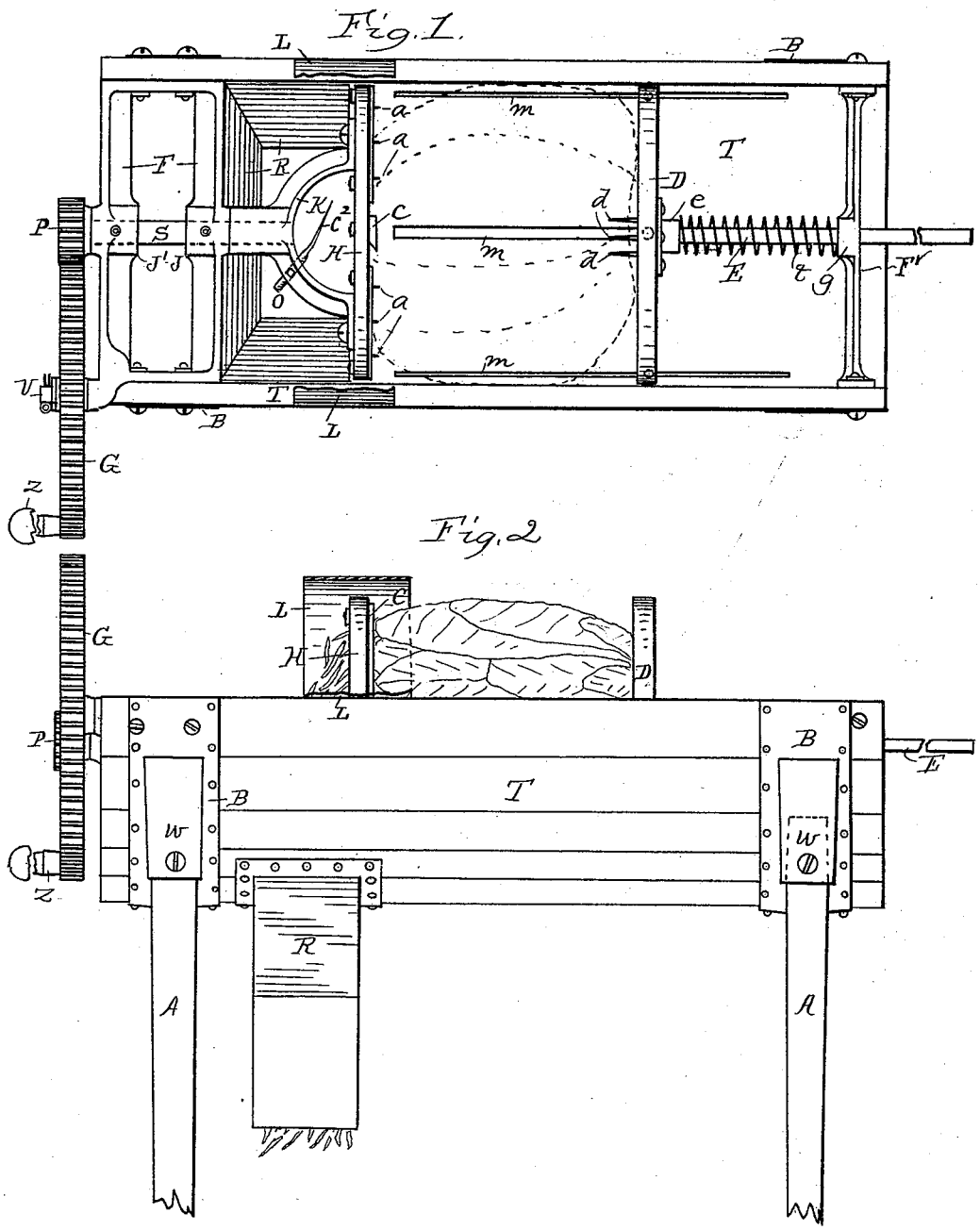

(No Model.) 3 Sheets—Sheet 2.
C. MARTINDALE.
KRAUT CUTTER.
No. 477,377. Patented June 21, 1892.
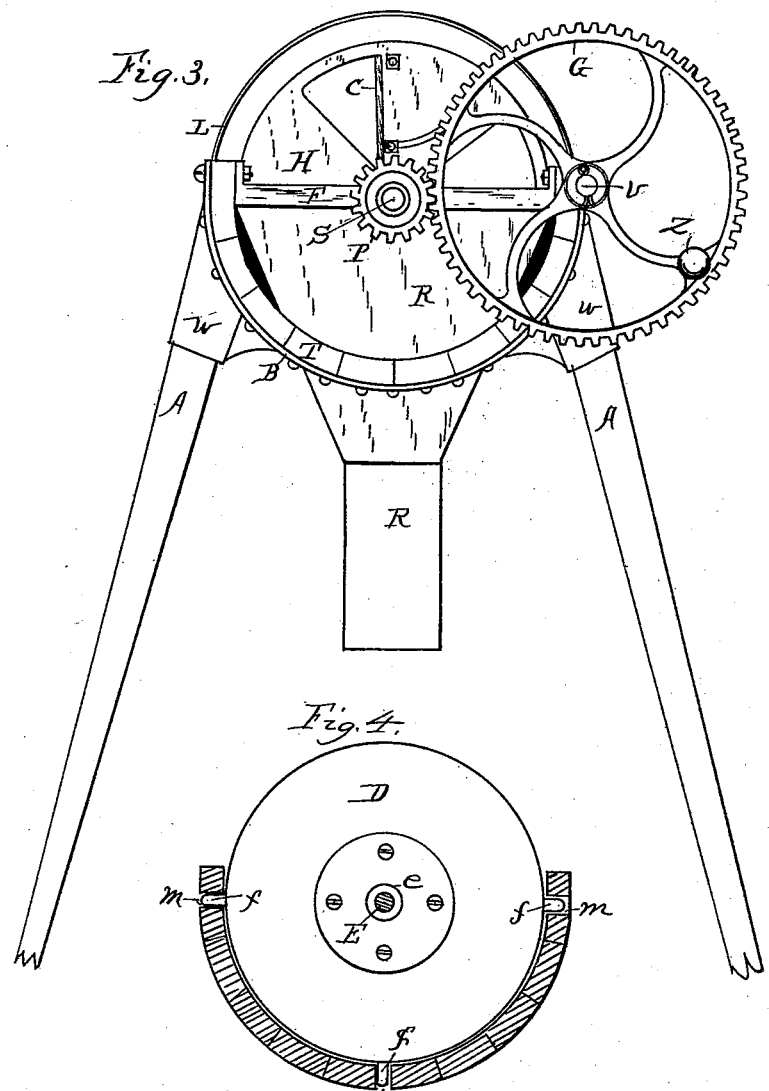

(No Model.) 3 Sheets—Sheet 3.
C. MARTINDALE.
KRAUT CUTTER.

No. 477,377. Patented June 21, 1892.

Witnesses
H. R. Hagin
W. C. Hutchins

Inventor
Crystal Martindale.
By Wm J Hutchins
Atty.

UNITED STATES PATENT OFFICE.

CRYSTAL MARTINDALE, OF WICHITA, KANSAS, ASSIGNOR TO HOMER CRESAP, OF SAME PLACE.

KRAUT-CUTTER.

SPECIFICATION forming part of Letters Patent No. 477,377, dated June 21, 1892.

Application filed October 19, 1889. Renewed March 14, 1892. Serial No. 424,773. (No model.)

*To all whom it may concern:*

Be it known that I, CRYSTAL MARTINDALE, a citizen of the United States of America, residing at Wichita, in the county of Sedgwick and State of Kansas, have invented certain new and useful Improvements in Kraut-Cutters, of which the following is a specification, reference being had therein to the accompanying drawings, and the letters of reference thereon, forming a part of this specification, in which—

Figure 1 is a top plan view of my invention. Fig. 2 is a side elevation of the same. Fig. 3 is an end elevation of the same. Fig. 4 is a cross-sectional view of the device in front of the spring-follower, showing a face plan thereof. Fig. 5 is a face plan view of the rotary cutter-head of the device, and Fig. 6 is an enlarged perspective view of the said cutter-head designed to more clearly show the cutters.

This invention relates to certain improvements in that class of kraut-cutters wherein the cabbage to be cut is held within a trough upon a fork, so as to be presented centrally to a rotary cutter-head having knives for slicing and cross-cutting the cabbage, which cutter-head is rotated by means of a crank and gearing mechanism, and as the cutting takes place the cabbage is automatically fed forward by means of a spring-follower to which the cabbage is forked, and wherein the center portion of the cutter-head is open and free from the cutting-knives to permit the cabbage-stump to pass within said open portion uncut, while the leafy portion of the cabbage about the stump is properly cut, and when cut is permitted to fall into a hopper and from thence into a proper receptacle below the hopper.

Referring to the drawings, T represents the trough of the device having the semicircular bands B B, one at either end, to which the trough is secured, which bands are provided with the sockets W into which the standards A are socketed, which standards support the trough at a suitable height for convenience to the operator.

F represents a frame secured across one end of trough T and is provided centrally with a pair of boxes J J' and a side stud V.

S represents a shaft arranged in said boxes and has secured on its inner end portion the yoke K, which yoke has secured to it the rotary cutter-head H, which is arranged to rotate within the said trough, as shown in Figs. 1 and 3. To the outer end portion of said shaft is secured a spur-pinion P, and on stud V of frame F is arranged a spur gear-wheel G, meshing with said pinion and provided with a crank Z by means of which the device is operated.

The cutter-head H is constructed with a central opening $h$ and with the radiating openings I. To one side of the said radiating openings are arranged and adjustably secured the cutting-knives $c$ and $c'$; the knives $c$ having each but a single cutting-edge, which overreach their respective openings and likewise radiate from the center adjacent the center opening $h$ to the periphery of the cutter-head, and when operated cut the cabbage in slices about the cabbage-stump. The knives $c'$ each have three cutting-edges $a$, arranged at regular intervals apart and cut the cabbage in advance of and in a manner at about right angles to the cut of knives $c$; and thus as knives $c$ cut the cabbage will be in short thin particles, the slices being gaged by the depth of cut of knives $c$, and the length of the sliced particles gaged by the distance apart of knives $a$. The said knives are held in position by means of small bolts or screws and arranged to be adjusted to change the degree of shear given to the cutting-edges by means of the inner bolts or screws sliding in the segmental slots $n$ of head H.

L represents a shield made of sheet metal, arched over the cutter-head H, and secured at either side to trough T for the purpose of preventing the cut particles of cabbage from being thrown from the machine.

R represents the hopper for catching the cut particles of cabbage as they leave the cutter-head, and is arranged partially within and partially depending from trough T between the said cutter-head and frame F and is open at its bottom, so as to deliver to a proper receptacle below.

D represents the follower-head, arranged in trough T parallel with and a distance from the face of the cutter-head, and is provided with a central rear extending bar E, supported at the end of trough T in a central box $g$ of cross-bar F', as shown in Fig. 1; also, with the side radiating pins $f\ f\ f$, which are arranged to slide in the slots $m\ m\ m$, respectively, of trough T, to guide the said follower and with the central face fork-tines $d$, also shown in Fig. 1.

$t$ represents a coil-spring arranged on bar E, between head D and box $g$ of said bar-support, and is for the purpose of yieldingly holding the head D, forward in its guide-slots $m$ toward the cutter-head and for automatically feeding a cabbage, which is forked to said follower to the cutter-head.

$c^2$ represents a knife-blade having a shank seated in a diagonal position in yoke K in the rear of cutter-head H, opposite the center opening $h$ of said head, and is for the purpose of cutting the leafy portion of the cabbage protruding from the advanced end of the cabbage-stump, which is not otherwise cut by the knives of the cutter-head, so that nothing of the leafy portion of the cabbage shall remain uncut.

In use follower-head D is pressed back, thus compressing spring $t$, and a cabbage is fixed on the fork-tines $d$, after which it is released, when the spring will act and yieldingly hold the cabbage centrally against the cutter-head. The crank Z is then grasped and turned, which will cause the cutter-head to rotate rapidly by means of the gearing mechanism, and thereby cut the cabbage, as before described, and as the cutting takes place the cabbage automatically feeds forward by means of spring $t$ until all but the stump is cut, as described, when the follower is again forced back, the stump removed from the fork, and another cabbage placed on the fork, and another like operation is made, thus using the cabbage from the field as they are grown without first having to divide them and remove their stumps.

Having thus described my invention, what I claim as new and useful, and desire to secure by Letters Patent, is as follows:

1. The combination, in the kraut-cutter described, with the trough T, provided with the standards A and hopper R, of the frame F, having the boxes J J', the shaft S, supported in said boxes, the yoke K, fixed on the inner end portion of said shaft, the cutter-head H, having the central opening $h$ and radiating openings I, and the cutters $c$ and $a$, the follower-head D, provided with the fork-tines $d$ and rear extending bar E, the coil-spring $t$, arranged on said bar for forcing said follower forward, and the gearing and crank mechanism for operating the cutter-head, substantially as and for the purpose specified.

2. In a kraut-cutter, the combination of the trough T, the shaft-bearings J J', the shaft S, mounted in said bearings, the yoke K, provided with the knife $c^2$ and fixed on said shaft, the cutter-head H, provided with central and radiating openings, and of the knives $c$ and $a$, secured to said head adjacent said openings and secured to and rotated with said shaft and yoke, and the spring-follower D, having the fork-tines $d$, and the gearing mechanisms for operating the machine, substantially as and for the purpose specified.

3. In the herein-described kraut-cutter, the combination of the trough T, provided with standards, and the hopper R, and shield L, the shaft-bearings J J', shaft S, and gears P and G, and crank Z, the cutter-head H, supported on shaft S through the medium of yoke K and provided with the openings $h$ and I and knives $c$ and $a$, and the spring follower-head D, provided with the fork-tines $d$, wherein a cabbage is supported on said tines and centrally presented to said cutter-head and automatically fed forward as the cutting takes place by means of said follower in such manner that the leafy portion of the cabbage is cut and the stump is left uncut, substantially as specified.

4. In the kraut-cutter described and shown, in combination with the trough T and rotary cutter-head H, the follower-head D, provided with the fork-tines $d$, arranged facing the central opening of said cutter-head, and with the rear extending bar E, supported at its outer end in a suitable cross-bearing $g$, and the coil-spring $t$, arranged on said bar between said follower and bearing for automatically pressing forward the said follower, substantially as and for the purpose specified.

CRYSTAL MARTINDALE.

Witnesses:
ASA WILSON,
E. U. WINDERS.